(12) United States Patent
Batchu et al.

(10) Patent No.: US 9,854,443 B2
(45) Date of Patent: Dec. 26, 2017

(54) MOBILE DEVICE TRAFFIC SPLITTER

(71) Applicant: MOBILE IRON, INC., Mountain View, CA (US)

(72) Inventors: Suresh Kumar Batchu, Milpitas, CA (US); Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 140 days.

(21) Appl. No.: 14/675,475

(22) Filed: Mar. 31, 2015

(65) Prior Publication Data

US 2015/0282041 A1    Oct. 1, 2015

Related U.S. Application Data

(60) Provisional application No. 61/973,086, filed on Mar. 31, 2014.

(51) Int. Cl.
| H04L 29/06 | (2006.01) |
|---|---|
| *H04W 12/08* | (2009.01) |
| H04W 40/00 | (2009.01) |

(52) U.S. Cl.
CPC .......... *H04W 12/08* (2013.01); *H04W 40/00* (2013.01)

(58) Field of Classification Search
USPC .................................. 370/338, 392, 389
See application file for complete search history.

(56) References Cited

U.S. PATENT DOCUMENTS

| 7,948,986 B1* | 5/2011 | Ghosh ................ H04L 45/50 370/392 |
|---|---|---|
| 8,464,335 B1 | 6/2013 | Sinha |
| 2003/0065711 A1* | 4/2003 | Acharya .......... H04L 29/12009 709/203 |
| 2009/0238084 A1* | 9/2009 | Nadeau .................. H04L 43/10 370/248 |
| 2011/0013637 A1* | 1/2011 | Xue ..................... H04L 12/4679 370/395.5 |
| 2011/0289134 A1 | 11/2011 | De Los Reyes |
| 2012/0054363 A1 | 3/2012 | Hart |
| 2012/0084184 A1 | 4/2012 | Raleigh et al. |
| 2012/0240183 A1 | 9/2012 | Sinha |
| 2013/0086236 A1* | 4/2013 | Baucke .................. H04L 45/50 709/223 |
| 2013/0287035 A1* | 10/2013 | Scholl .................... H04L 45/00 370/400 |
| 2014/0026179 A1 | 1/2014 | Devarajan |
| 2014/0040978 A1 | 2/2014 | Barton et al. |
| 2014/0066008 A1 | 3/2014 | Ingino |

\* cited by examiner

*Primary Examiner* — Sai Aung
(74) *Attorney, Agent, or Firm* — Van Pelt, Yi & James LLP

(57) ABSTRACT

A mobile device traffic splicer is disclosed. In various embodiments, a network communication associated with a destination is received from a mobile device. A stored routing data associated with the mobile device is used to determine, based at least in part on the destination, to redirect the network communication to a proxy associated with the destination. The network communication is sent to the proxy associated with the destination. In various embodiments, one or both of metering network traffic by destination and/or domain and filtering network communications and/or portions thereof based on the destination and/or domain may be performed.

17 Claims, 6 Drawing Sheets

400

| Device | Policy and Setting | Allowed to | Filter |
|---|---|---|---|
| 1234 | Exchange | Enterprise 1 | |
| 1234 | Exchange | Enterprise 2 | |
| 1234 | Apps | Enterprise 1 | Installation, removal, Inventory(installed only) |
| 1234 | Apps | Enterprise 2 | Installation, removal, Inventory(all) |
| 1234 | Traffic Splice | Enterprise 1 | Domain(ent1.com) |
| 1234 | Traffic Splice | Enterprise 2 | IP-Net(210.1.1.0/24) |
| 1234 | device lock down | App Server 1 | camera capture lock |

FIG. 4

MOBILE DEVICE TRAFFIC SPLITTER

CROSS REFERENCE TO OTHER APPLICATIONS

This application claims priority to U.S. Provisional Patent Application No. 61/973,086 entitled BYOD TRAFFIC SPLICER filed Mar. 31, 2014 which is incorporated herein by reference for all purposes.

BACKGROUND OF THE INVENTION

Employees increasingly may use personal devices (e.g., mobile phone, tablet, laptop, etc.) for work purposes, sometimes referred to as "bring your own device" (BYOD). When a device is used in a BYOD environment, a company may need to manage the employee's device to secure the contents and apps before allowing a device to be used for work. When a device is managed by the company, even though device owner is the employee, the employee may lose at least some control of the device and privacy (e.g., app and usage can be reported to company's management server). In certain cases, complexity is introduced when the employee's device is shared with family members and/or when the employee works for multiple companies. For example, an employee and/or device may have to change back and forth between each of multiple companies' management servers. In some scenarios, the increased complexity may make the user less inclined to use their device in a BYOD environment.

Some enterprises may need to bring an app's traffic to the enterprise's controlled network for security and audit, but it may be difficult to run device level virtual private network (VPN) and/or proxy because the device is being shared between enterprises. And in the case in which an enterprise reimburses data usage, it may be cumbersome to accurately reimburse usage costs when an employee uses a device across multiple enterprises.

BRIEF DESCRIPTION OF THE DRAWINGS

Various embodiments of the invention are disclosed in the following detailed description and the accompanying drawings.

FIG. 4 is a block diagram illustrating an example of a data structure used to store configuration and policy information in an embodiment of a mobile device management (MDM) system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Routing mobile device traffic through a secure node configured to split and route traffic to different destinations depending on policies or other configuration data is disclosed. In various embodiments, mobile device traffic is routed through a traffic splicer that processes traffic from the device and splits the traffic between enterprise and ordinary cloud usage. In various embodiments, a traffic splicer may relay traffic to an enterprise's network (e.g., a direct connection, VPN, and/or proxy). According to some embodiments, a traffic splicer may meter traffic usage and/or may provide other traffic security features (e.g., traffic audit logging, application programming interface (API) level filtering, etc.). In some embodiments, metered traffic usage can be calculated as a network access cost and reimbursed to an employee/owner of the device.

Figure 1:
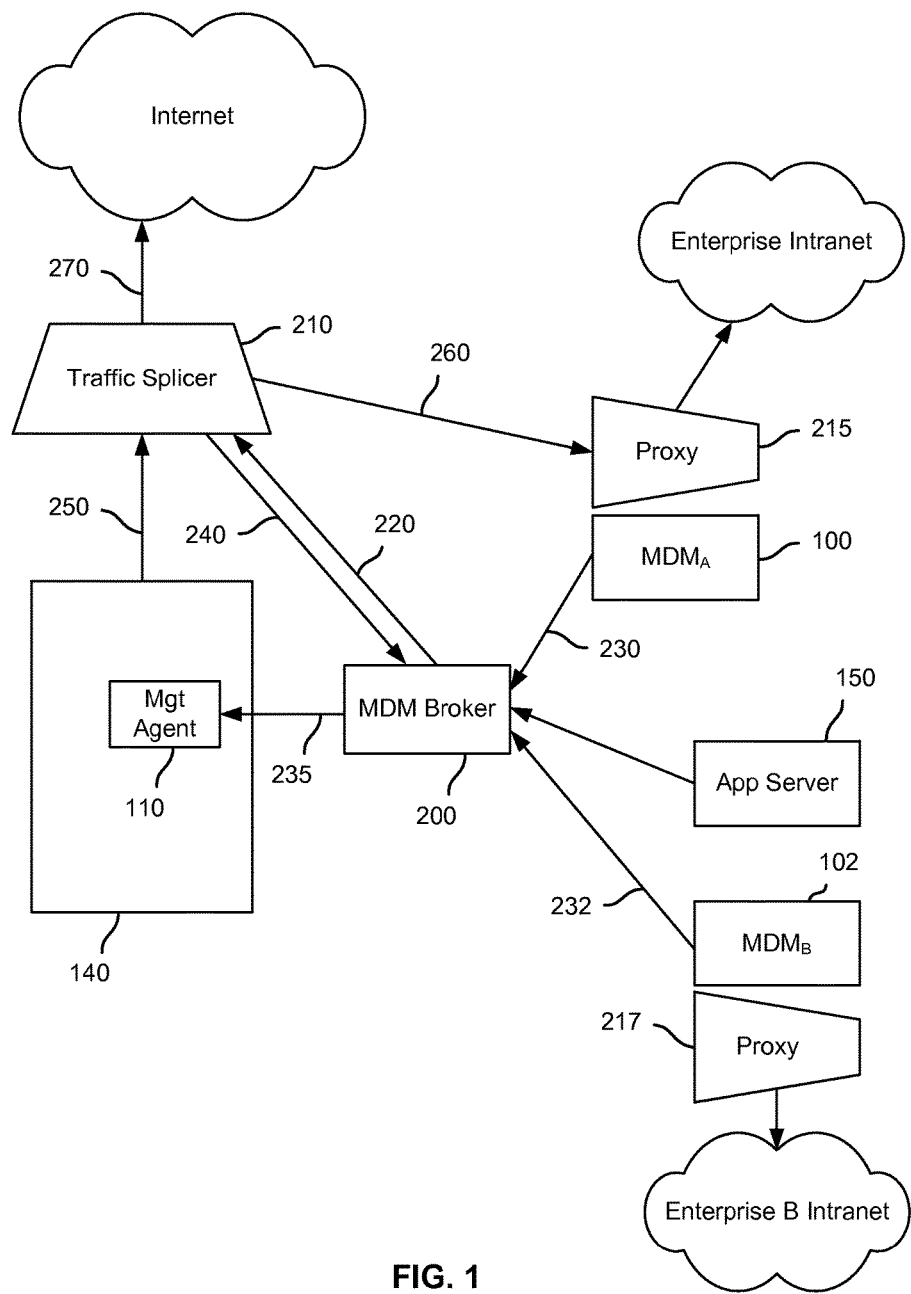
FIG. 1 is a block diagram illustrating an embodiment of an MDM broker system configured to manage participation by one or more MDM authorities, e.g., MDM servers, MDM-enable application servers, etc., in management of a mobile device.

FIG. 1 is a block diagram illustrating an embodiment of an MDM broker system configured to manage participation by one or more MDM authorities, e.g., MDM servers, MDM-enable application servers, etc., in management of a mobile device.

In various embodiments, a device management server, such as MDM servers 100 and 102 in FIG. 1, may be associated with an enterprise, consumer, and/or other entity. For example, each of one or more companies may have a different type of MDM server, e.g., MDM server 100 may be a first type of MDM server, from a first third party MDM provider, and MDM server 102 may be a second type of MDM server, from a different third party MDM provider. In the example shown, a device management agent 110 (e.g., MDM Agent) is installed on the BYOD device 140. In various embodiments, a type of management agent 110 may, for example, depend on the device OS. The agent 110 can, for example, be embedded to the OS (e.g., iOS, Windows phone), an application with device management permission (e.g., Android), and/or another type of management agent 110.

In various embodiments, an application server such as application server 150 may send device management commands to BYOD Device 140 via MDM proxy 200. MDM proxy 200 may be configured, for example by a user of Device 140 to delegate/grant to application server 150 a specific scope of management authority and/or privileges with respect to Device 140.

In some embodiments, MDM proxy 200 may receive management commands from device management servers such as MDM server 100 and/or MDM server 102. The cloud MDM proxy 200 may, for example, pass the commands to the device management agent 110 (e.g., after authentication and authorization). The cloud MDM proxy 200 may also perform privacy filtering and/or information encryption before sending device information from the device management agent 110 to device management server 100.

Figure 2:
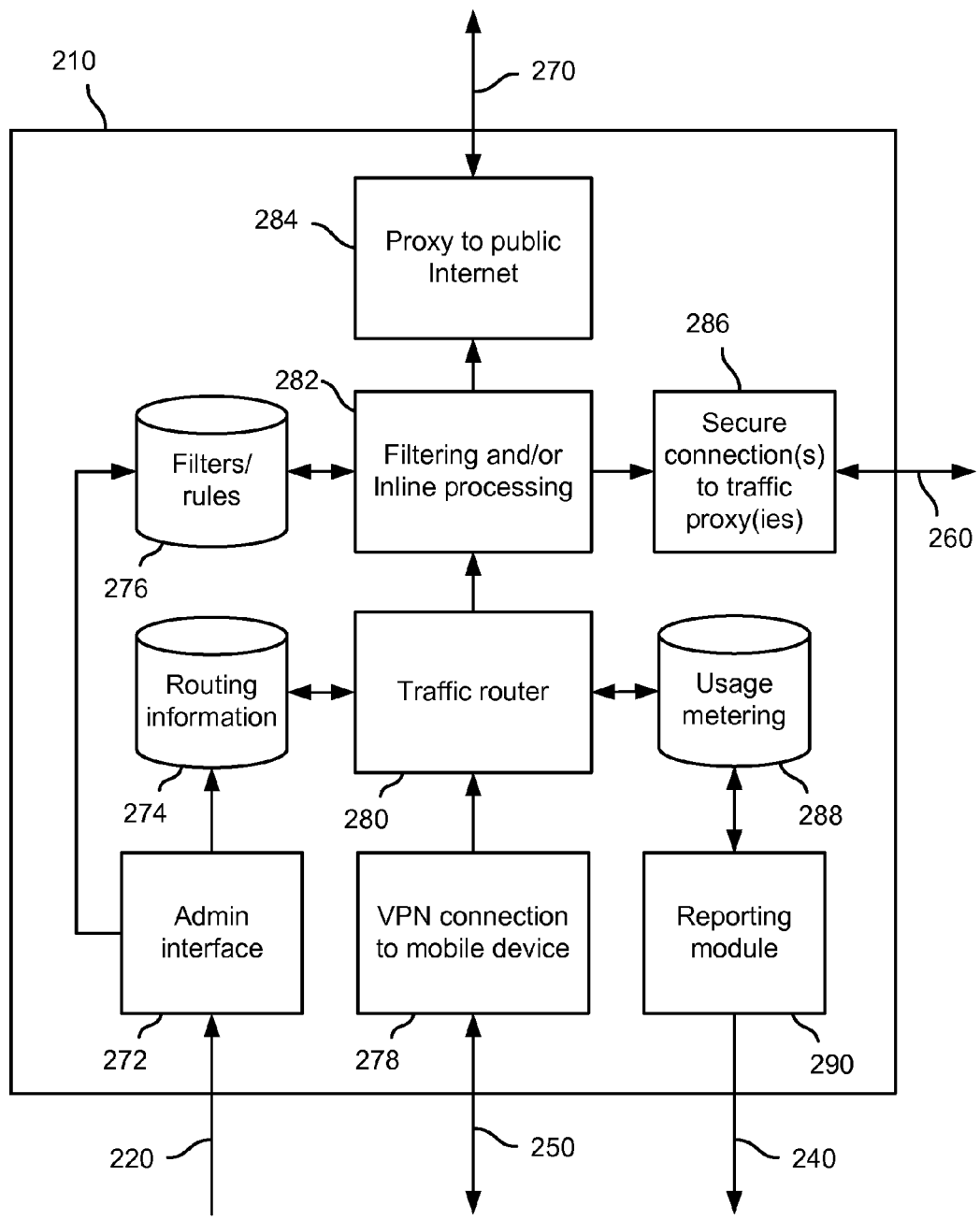
FIG. 2 is a block diagram illustrating an embodiment of a mobile traffic splicer system.

While an "MDM proxy" 200 is shown in FIG. 2, in various embodiments the brokering described herein as being performed by MDM proxy 200 in the example shown in FIG. 2 may be performed by another management, broker, or proxy node, such as a management server.

In various embodiments, all or part of the mobile device management described herein, in particular the management required to keep one enterprise's app-related content and activity separate from that of another enterprise and/or the personal app content and activity reserved to the user personally, may be provided at least in part by using app-level management functionality of the mobile operating system, such as iOS7 managed apps or the "Android for Work" feature of the Android operating system, and/or by a third party management infrastructure provided on the device to manage apps individually, such as MobileIron's® AppConnect™ technology. For example, MobileIron's® AppConnect™ technology may be used to associate the applications of enterprise A with one secure bus accessible by those apps and a second, separate secure bus associated with apps of enterprise B. Apps within each respective set of apps (enterprise A or B) would have secure access to content and information shared via the AppConnect™ bus associated with that set of apps only.

In various embodiments, a cloud traffic splicer 210 may include a proxy server that connects the device cellular and/or Wi-Fi traffic to the Internet, e.g., via connection 270.

According to some embodiments, a traffic proxy 215, 217 may, for example, be associated with a device management server 100, 102 (e.g., an enterprise, consumer, and/or other server). For example, each of multiple companies may have a different proxy server (e.g., different type of proxy server). The traffic proxy 215 may connect traffic to enterprise A's intranet, associated with MDM server 100, while traffic proxy 217 may connect traffic to enterprise B's intranet, associated with MDM server 102 in this example.

In various embodiments, a cloud MDM proxy 200 may manage (220) a cloud traffic splicer 210. A management proxy protocol 230, 232 may allow a device management server 100, 102 to communicate with the cloud MDM proxy 200. Device management protocol 235 may facilitate communications between the device management agent 110 and cloud MDM proxy 200.

In various embodiments, a device owner (e.g., employee) may configure a device management agent 110 on a BYOD device 140 to be managed by a cloud MDM proxy 200. The cloud MDM proxy 200 may, for example, maintain configurations for a list of trusted device management servers 100, application servers 150, and/or other nodes. The cloud MDM proxy 200 may authorize device management functions/information, and/or perform other operations. In various embodiments, during registration a device owner may select allowed permissions for device management servers, such as MDM servers 100, 102 and/or application servers, such as application server 150, and/or other nodes. In the event a device management server 100, 102 requires device information, the cloud MDM proxy 200 may filter the information and send it to the device management server 100, 102. In various embodiments, depending on an information disclosure policy, a cloud MDM proxy 200 may report filtered information, so the device management server 100 can decide what to do for missing information.

According to some embodiments, a device owner may configure a BYOD device 140 to use the cloud traffic splicer 210 for network access (e.g., cellular, Wi-Fi, and/or other Internet access). In various embodiments, the cloud traffic splicer 210 may be configured by the cloud MDM proxy 200. The cloud MDM proxy 200 may configure the cloud traffic splicer 210 with a policy to splice traffic associated with enterprise A to the traffic proxy 215, traffic associated with enterprise B to the traffic proxy 217, and other traffic to the Internet and/or other destination(s) as configured, e.g., depending on the nature/content of the communication, the originating app, etc. In various embodiments, a cloud traffic splicer may be configured to meter data traffic usage associated with accessing the company intranet, and the company may reimburse the employee for enterprise data usage, e.g., to promote the employee staying with the company.

According to various embodiments, an enterprise device management server 100, application server 150, and/or other node may send push messaging to BYOD device 140 using, for example, a cloud MDM proxy 200 provided application programming interface (API). In various embodiments, push messages can be used to wake up a BYOD Device 140 (e.g., to get latest device status). For example, push messages can be delivered to a device using a device OS push message framework (e.g., iOS push notification, Android's Google Cloud Messaging, Windows's Windows Push Messaging, etc.). In another example, push messages may be delivered using customer push messaging (e.g., short messaging service (SMS) text messages, custom messaging delivery mechanism, etc.).

According to some embodiments, a traffic splicer 210 may provide a data usage metering report 240 to the MDM broker/proxy 200.

In various embodiments, traffic 250 may be (re)directed 250 from the device 140 to the traffic splicer 210 using, for example, device platform features (e.g., VPN, access point name (APN), APN Proxy, device wide proxy), VPN software and/or app level traffic processing logic (e.g., app proxy, app tunnel, etc.). In some embodiments, the traffic splicer 210 may split and/or route traffic via a connection 260 to a traffic proxy such as traffic proxy 215 (e.g., associated with an enterprise, consumer, etc.), enterprise backend server(s), cloud service 270, and/or one or more other nodes. These configurations can be pushed to the BYOD device 140 using device management agent 110 (e.g., MDM agent) by the cloud MDM proxy 200 using the device management protocol 235.

According to various embodiments, the traffic splicer 210 may process traffic from the device 140 and split the traffic between enterprise, cloud (e.g., ordinary cloud usage), and/or other nodes. The cloud traffic splicer 210 may, for example, relay traffic 260 to an enterprise's network (e.g., direct connection, VPN, and/or proxy 215), to the Internet 270, and/or other node depending, for example, on a configuration provided (e.g., pushed to the traffic splicer 210) by the cloud MDM proxy 200.

In various embodiments, the cloud traffic splicer 210 may meter traffic usage of traffic to enterprise 260, traffic to Internet 270, and/or other destinations. The cloud traffic splicer 210 can provide traffic security features including, for example, traffic audit logging, API level filtering, and/or other protection/security. The cloud traffic splicer 210 may report metered traffic usage to a cloud MDM proxy 200. The cloud MDM proxy 200 can calculate usage cost per device and/or enterprise. The cloud MDM proxy 200 may build configuration(s) for cloud traffic splicer 210 based on commands from the device management server 100, app server 150, and/or any other node configured (e.g., allowed) to manage BYOD device 140.

According to some embodiments, using usage data from cloud traffic splicer 210, the MDM proxy 200 may calculate usage per device for each enterprise. Depending on model (e.g., cellular usage plan) used by an enterprise, usage costs can be charged back to the enterprise. Also, for enterprises that reimburse data usage, usage cost can be credited to a BYOD device 140. In some embodiments, with a cloud traffic splicer, an enterprise may reimburse an employee for enterprise data usage.

In various embodiments, using usage data from cloud traffic splicer 210, an MDM proxy 200 can alert device owner about device's network usage (e.g., an excessive roaming data usage alert). Usage data can be provided, for example, on a per application, per API, per group of applications, and/or other basis.

According to various embodiments, using a cloud MDM proxy (or device level MDM proxy agent) and cloud traffic splicer, a device owner can delegate management to an approved enterprise and/or applications. For example, a user can delegate certain management features and data can be managed by the each enterprise or apps.

In various embodiments, an enterprise device management server and/or app server can interact with a cloud MDM proxy (or device-level MDM proxy agent) and manage device and get device information. A cloud traffic splicer can splice device's data traffic to internet, enterprise backend, and/or relaying proxy servers after securing traffic (e.g., using filtering, encryption, etc.). Using the techniques disclosed herein in various embodiments enterprises can securely connect to cloud MDM proxy (or device level MDM proxy agent) after building trust with device owner.

FIG. 2 is a block diagram illustrating an embodiment of a mobile traffic splicer system. In the example shown, an embodiment of traffic splicer 210 is shown to include an administrative interface 272 configured to receive configuration data 220, e.g., from an MDM proxy/broker such as MDM proxy 200. Configuration data associated with routing or splicing mobile device traffic to enterprise or other network destinations may be stored in a routing information data store 274, and filtering and/or other inline processing rules (e.g., encryption) may be stored in filter/rule data store 276. A VPN connection 250 to a mobile device may be established via a VPN or other secure communication interface or module 278, including, e.g., a network or other communication interface configured to provide secure connectivity to a mobile device via VPN connection 250. Traffic received from a mobile device, e.g., via VPN connection 250 and VPN module/interface 278 is provided to a traffic router module 280, which splices select traffic to corresponding destinations (e.g., public Internet, enterprise intranet via a specified enterprise proxy, such as proxy 215, 217) based on routing information stored in routing information store 274. Traffic from the mobile device may be filtered (e.g., to prevent enterprise or other restricted content from being sent via the public Internet) and/or processed inline (e.g., encrypted) by filtering/inline processing module 282, as/if indicated by corresponding data stored in filter/rule data store 276. Traffic routed to the public Internet may be sent via proxy 284 and connection 270. Traffic that has been (re)directed to an enterprise or other intranet, e.g., via a proxy such as proxy 215, may be sent via a corresponding secure connection and associated interface 286, 260. Usage may be metered by destination/domain and stored in usage metering data store 288. A reporting module 290 may generate and send usage reports 240, e.g., to indicate an amount or percentage of data traffic that was associated with access to an enterprise network, such as an intranet. In some embodiments, a mobile device owner/user may receive reimbursement payments based on usage data as gathered and reported by traffic splicer 210.

Figure 3:
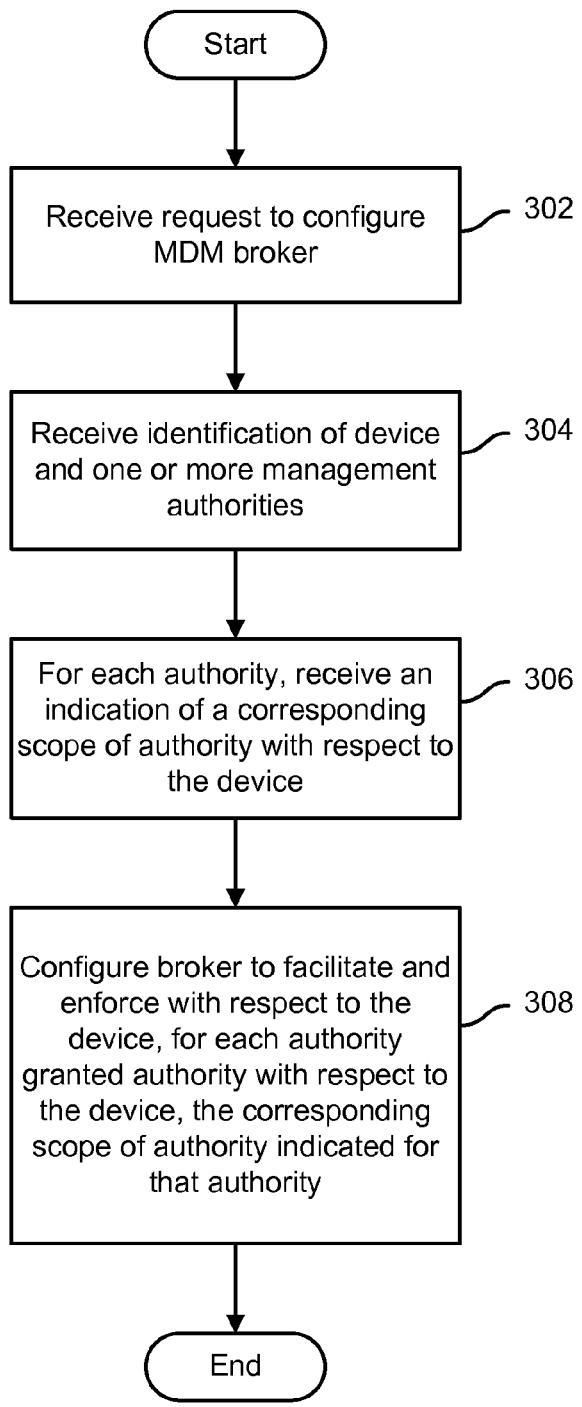
FIG. 3 is a flow chart illustrating an embodiment of a process to configure an MDM broker to manage participation by multiple servers in management of a mobile device.

FIG. 3 is a flow chart illustrating an embodiment of a process to configure an MDM broker to manage participation by multiple servers in management of a mobile device. In various embodiments, the process of FIG. 3 may be performed by and/or with respect to an MDM proxy agent/broker installed on a mobile device, such as MDM proxy agent/broker 120 of FIG. 1, or an external MDM proxy/broker, such as MDM broker 200 of FIG. 2. In the example shown, a request to configure the MDM broker is received (302). For example, a device owner and/or administrative user may have accessed a web-based or other administrative user interface. An identification of a mobile device and one or more management authorities (e.g., MDM server 100, MDM server 102, app server 150, etc.) is received (304). For each authority, an indication of a corresponding scope of authority with respect to the device, e.g., a set of management rights and/or privileges, is received (306). For example, an administrative user interface may enable a device owner to indicate a scope of authority for each of the management authorities identified by the user. The MDM broker (e.g., MDM broker 120 or MDM broker 200) is configured to facilitate and enforce with respect to the device, for each authority to which authority is granted, the corresponding scope of authority defined by the user (308). For example, the MDM broker may be configured to perform filtering, as required, to ensure a management authority does not receive information to which the owner has not granted that authority access.

FIG. 4 is a block diagram illustrating an example of a data structure used to store configuration and policy information in an embodiment of a mobile device management (MDM) system. In some embodiments, a user interface may be provided to enable a user, such as a device owner, to define policies and settings such as those in the example shown in FIG. 4.

In various embodiments, by configuring a cloud MDM proxy, e.g., MDM proxy/broker 200 (or device level MDM proxy agent, such as MDM proxy agent 120) and a cloud traffic splicer, such as traffic splicer 210, a device owner can delegate management to one or more enterprise MDM servers and/or app servers. For example, a user can delegate specific management features selected by the user, and can specify which data can be managed by which enterprise MDM server and/or app server.

According to some embodiments, an enterprise device management server and/or app server can interact with a cloud MDM proxy (or device level MDM proxy agent) to manage a device and/or get device information. In various embodiments, an enterprise MDM server and/or app server may exercise control over apps and/or data on a managed device and/or obtain information from and/or about the device, via the MDM proxy, to an extent defined by an owner of the device, e.g., via a web-based or other user interface.

In the example shown in FIG. 4, for example, for the device "1234", the owner has authorized MDM servers associated with "Enterprise 1" and "Enterprise 2", respectively, to define policies and/or adjust settings on the device with respect to device interactions with Microsoft Exchange® servers of those enterprises. For example, such an authority may enable each of the enterprises to establish on the device 1234, via the MDM proxy 200, an enterprise-specific email profile, subject to the control and ownership of the enterprise. Each enterprise could then control its own enterprise content, e.g., by removing the profile and associated content data through a command/request sent to the MDM proxy 200. In some embodiments, the MDM proxy 200 would check a data structure such as table 400 of FIG. 4, determined based on the corresponding entry in table 400 that the enterprise MDM server has been grant authority to take compliance actions with respect to email profiles associated with that enterprise MDM server, and would relay or otherwise forward to the device 1234 a command that would result in removal of the profile and associated content, in various embodiments without affecting profiles and/or content associated with other entities and/or the owner personally.

Referring further to the example shown in FIG. 4, the same two enterprises have been granted authority with respect to apps installed on the device 1234, but in this example the user (e.g., device owner) has granted slightly different privileges to the enterprises. Specifically, in this example, the user has granted to "Enterprise 1" the right to install apps, and to remove or obtain an inventory of only those apps that were installed by that enterprise. By comparison, in this example, "Enterprise 2" has been granted the authority to install, remove, or obtain an inventory of all apps on the device. In this example, the second enterprise may have a policy or requirement that the employee provide this higher level of authority of apps on the device 1234, whereas the first enterprise may require only that it be given control over apps that are installed by that enterprise. In other examples, different requirements may exist, and a user/owner of a device may allocate and/or restrict authority at various levels of granularity and specificity.

In some embodiments, an on-device or cloud-based MDM broker, such as MDM broker 120 of FIG. 1 or MDM broker 200 of FIG. 2, may facilitate the exercise by MDM servers and/or application servers of authority that has been granted to them, as in the example shown in FIG. 4, subject to the restrictions and qualifications specified by the user/owner.

In the example shown in FIG. 4, a limited management authority has been granted to "App Server 1", e.g., app server 150 in the example shown in FIG. 1. In various embodiments, a limited MDM functionality may be built into an application on the app server side, to enable application-related control over the device to be exercised. For example, an MDM module or plug in may be provided, or a software development kit (SDK) or other code provided and included in the application code running at the app server, and/or the application developer may write code to invoke an application programming interface (API) of the MDM broker, to enable MDM functionality to be incorporated and/or provided.

In the example shown in FIG. 4, "App Server 1" has been granted authority with respect to "device lock down", but subject to a "filter" that limits the application to being able to set a "camera capture lock" to prevent screen capture. For example, an application (e.g., Snapchat™) may wish to provide a guarantee that the privacy of communications and/or the ephemeral nature of communications will not be compromised through device screen capture, and could require users to grant an authority such as the one shown in FIG. 4 as a condition to use the app. In various embodiments, an application server may use such a grant of authority, e.g., to send a command to the device, via the MDM broker, at the start of an app server facilitated connection or session.

A cloud traffic splicer may, in various embodiments, splice device data traffic to the Internet, enterprise backend, and/or relaying proxy servers, depending on how the splicer has been configured. In some embodiments, the splicer may be configured to secure traffic (e.g., filtering, encryption, etc.). In the example shown in FIG. 4, a first enterprise ("Enterprise 1") has been granted authority to configure a traffic splicer with which the device 1234 is associated to splice traffic associated with Enterprise 1, the scope of authority in this example being defined as traffic associated with the "ent1.com" domain. A second enterprise ("Enterprise 2") has been granted authority to configure the traffic splicer with respect to traffic associated IP addresses in the range indicated, which may correspond to the enterprise's internal network, e.g., an intranet.

In various embodiments, the grants of authority shown in FIG. 4 may enable the corresponding MDM servers to configure the traffic splicer, via interactions with the MDM broker, to splice traffic associated with each respective enterprise to a proxy or other node associated with that enterprise. For example, referring to FIG. 2, MDM servers 100, 102 may interact via protocols 230, 232 with MDM broker 200 to cause the splicer 210 to be configured via communications 220 to route each enterprise's traffic to the destination specified by that enterprise, e.g., to proxy 215 is the case of MDM server 100 or to proxy 217 in the case of MDM server 102. In some embodiments, the MDM/application server or another node may serve as the traffic proxy.

Figure 5:
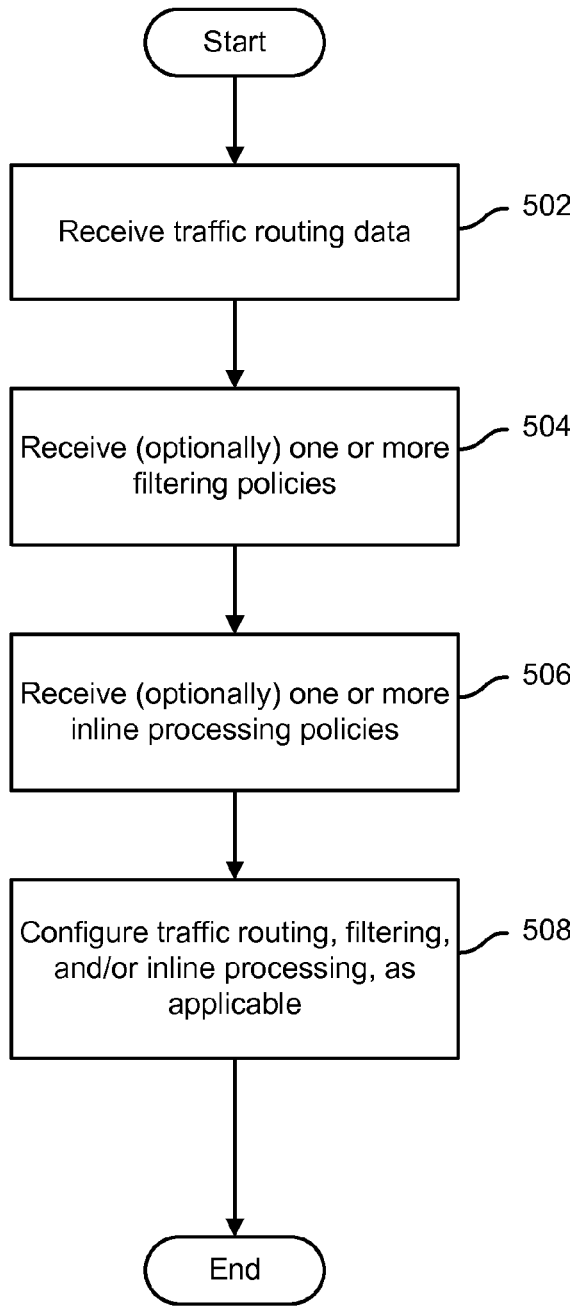
FIG. 5 is a flow chart illustrating an embodiment of a process to configure a mobile traffic splicer.

FIG. 5 is a flow chart illustrating an embodiment of a process to configure a mobile traffic splicer. In various embodiments, the process of FIG. 5 may be performed by a traffic splicer, such as traffic splicer 270 of FIG. 1. In the example shown, traffic routing data is received (502), e.g., from an MDM broker such as MDM broker 200 of FIG. 1. For example, an MDM authority, such as MDM server 100 of FIG. 1, may have sent via MDM broker 200 a configuration data indicating that data communications associated with a domain and/or subnet associated with the MDM server 100 should be (re)directed to a proxy, such as proxy 215, to provide secure connectivity to an enterprise intranet or other private network, for example. One or more filtering policies may (optionally, in some embodiments) be received (504). Examples of filtering policies include, without limitation, policies to prevent enterprise or other managed content from being sent to the public Internet, etc. One or more inline processing policies may (optionally, in some embodiments) be received (506). Examples of inline processing policies include, without limitation, policies to encrypt enterprise or other managed content data prior to such data being sent to the public Internet. Traffic routing, filtering, and/or inline processing, as applicable, are configured to be performed (508), e.g., by the applicable processing modules such as those shown in FIG. 2.

Figure 6:
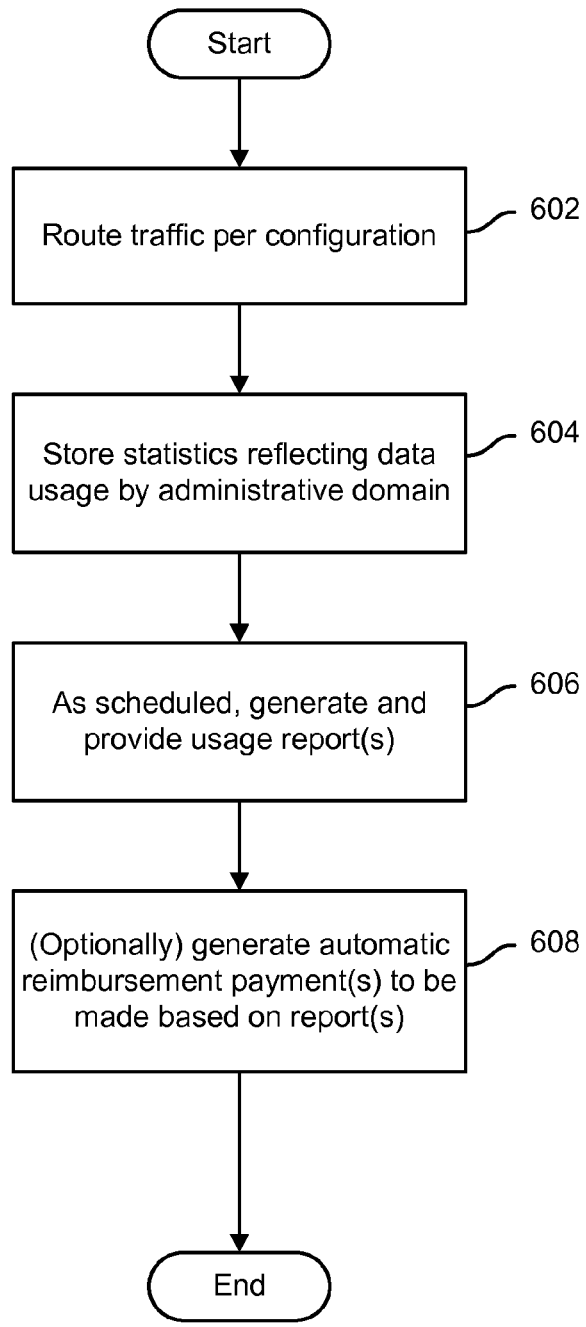
FIG. 6 is a flow chart illustrating an embodiment of a process to meter mobile data traffic by paying entity.

FIG. 6 is a flow chart illustrating an embodiment of a process to meter mobile data traffic by paying entity. In various embodiments, the process of FIG. 6 may be performed by a traffic splicer, such as traffic splicer 270 of FIG. 1. In the example shown, traffic is routed as indicated by routing configuration data (602). For example, mobile device traffic associated with an enterprise may be routed to a proxy, such as proxy 215 of FIG. 1, as configured by an associated MDM server, e.g., MDM server 100 of FIG. 1, via an MDM broker, such as MDM broker 200. Statistics are stored reflecting data traffic usage by administrative domain (604), e.g., Enterprise 1 versus Enterprise 2 versus public Internet. As scheduled (or on request, as triggered by policy, etc., in various embodiments), data usage reports are generated and provided to respective designated report recipients (606), e.g., via an MDM broker such as MDM broker 200. In some embodiments, automatic reimbursement payments may be generated based on the data usage reports (608). For example, the MDM broker and/or MDM server may receive a report and generate automatically a reimbursement payment to the owner/user of the mobile device, to reimburse the owner/user for data plan usage and/or costs associated with use of a personal mobile device to access enterprise network based resources.

In various embodiments, techniques disclosed herein may be used to enable mobile device traffic associated with multiple different administrative domains (e.g., personal, one or more enterprises, etc.) to be controlled, filtered, modified, directed/redirected, etc. based on the preferences and settings established by the respective mobile device management (MDM) authority of each domain. Techniques disclosed herein may enable mobile device traffic to be controlled and secured as desired by an enterprise or other owner to the data. In some embodiments, usage by administrative domain may be metered, enabling partial reimbursement to be provided to employees who use their personal mobile device to perform work for an enterprise or other entity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing a mobile device, comprising:
   receiving, at a traffic splitter from a mobile device, a network communication associated with a destination;
   using a stored routing data associated with the mobile device to determine, based at least in part on the destination, to redirect the network communication to a proxy associated with the destination;
   using a stored policy to determine to filter the network communication, wherein filtering the network communication includes blocking or removing at least a portion of data comprising the network communication;
   sending the network communication to the proxy associated with the destination; and
   metering, by the traffic splitter, traffic usage from the mobile device to the proxy associated with the destination, wherein the metered traffic usage includes a measure of an amount and/or percentage of data traffic between the mobile device and the proxy associated with the destination.

2. The method of claim 1, wherein the traffic splicer is configured to receive and store said routing data.

3. The method of claim 2, wherein the routing data is provided via an MDM broker by an MDM authority associated with the destination.

4. The method of claim 1, wherein the destination comprises a domain or portion thereof.

5. The method of claim 1, wherein the destination comprises a subnetwork or other IP address range.

6. The method of claim 1, further comprising using a stored policy to determine to perform inline processing with respect to the network communication.

7. The method of claim 6, wherein the inline processing includes encrypting at least a portion of data comprising the network communication.

8. The method of claim 1, wherein the proxy is associated with an MDM server associated with the destination.

9. The method of claim 1, further comprising updating a usage statistic associated with the destination to reflect the network communication.

10. The method of claim 9, further comprising using the usage statistic to generate a report.

11. The method of claim 9, further comprising using the usage statistic to generate an automatic reimbursement payment.

12. A system, comprising:
    a communication interface; and
    a processor coupled to the communication interface and configured to:
      receive from a mobile device, via the communication interface, a network communication associated with a destination;
      use a stored routing data associated with the mobile device to determine, based at least in part on the destination, to redirect the network communication to a proxy associated with the destination;
      use a stored policy to determine to filter the network communication, wherein filtering the network communication includes blocking or removing at least a portion of data comprising the network communication;
      send the network communication to the proxy associated with the destination; and
      meter traffic usage from the mobile device to the proxy associated with the destination, wherein the metered traffic usage includes a measure of an amount and/or percentage of data traffic between the mobile device and the proxy associated with the destination.

13. The system of claim 12, further comprising a storage device configured to store said routing data.

14. The system of claim 13, wherein the processor is further configured to receive via an administrative user interface a definition of said routing data and to store said routing data in said storage device.

15. The system of claim 14, wherein the routing data is provided via an MDM broker by an MDM authority associated with the destination.

16. The system of claim 12, wherein the destination comprises a subnetwork or other IP address range.

17. A computer program product to manage a mobile device, the computer program product being embodied in a non-transitory computer readable storage medium and comprising computer instructions for:
    receiving from a mobile device a network communication associated with a destination;
    using a stored routing data associated with the mobile device to determine, based at least in part on the destination, to redirect the network communication to a proxy associated with the destination;

using a stored policy to determine to filter the network communication, wherein filtering the network communication includes blocking or removing at least a portion of data comprising the network communication;

sending the network communication to the proxy associated with the destination; and metering traffic usage from the mobile device to the proxy associated with the destination, wherein the metered traffic usage includes a measure of an amount and/or percentage of data traffic between the mobile device and the proxy associated with the destination.

* * * * *